Patented Feb. 8, 1944

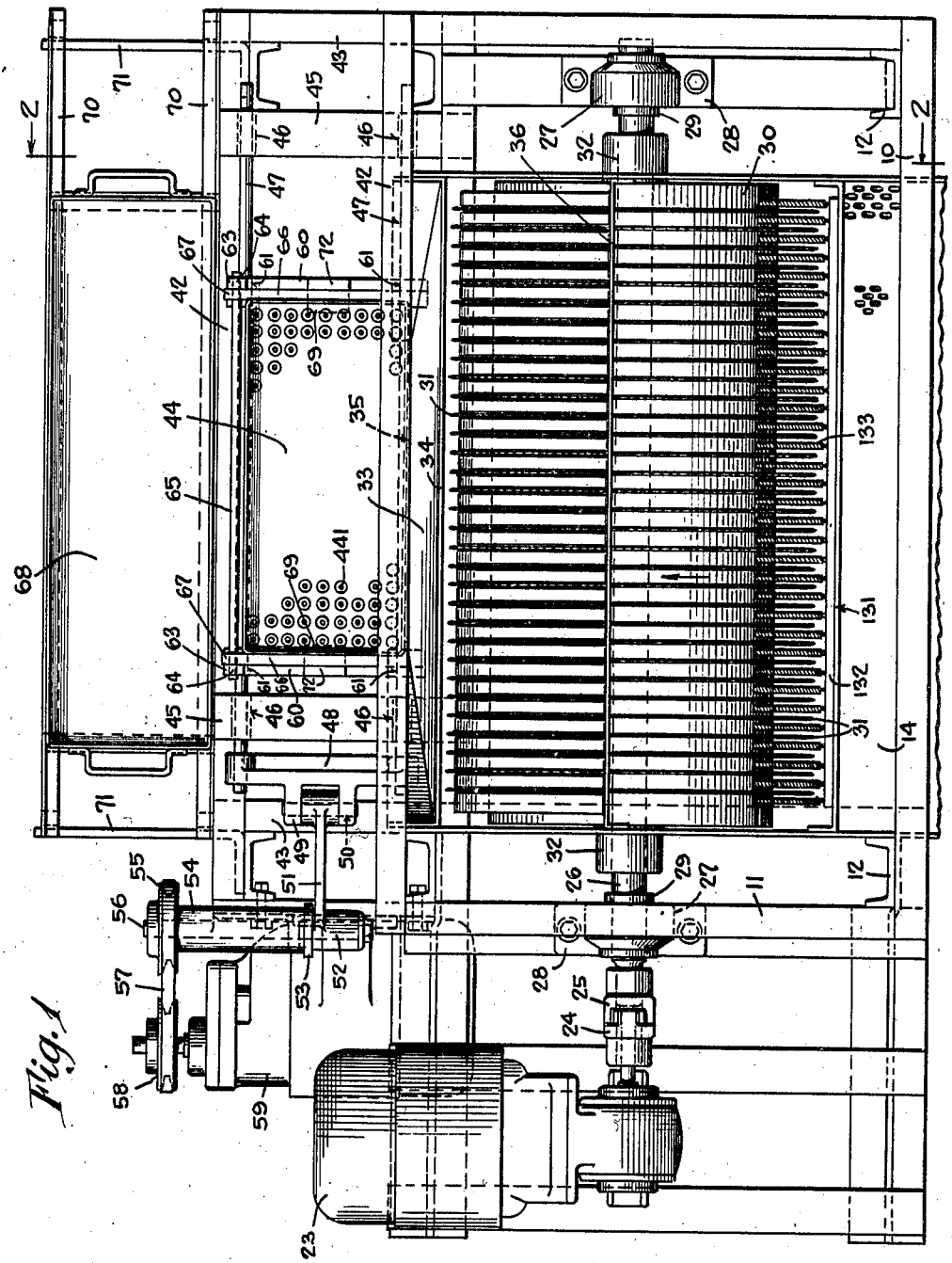

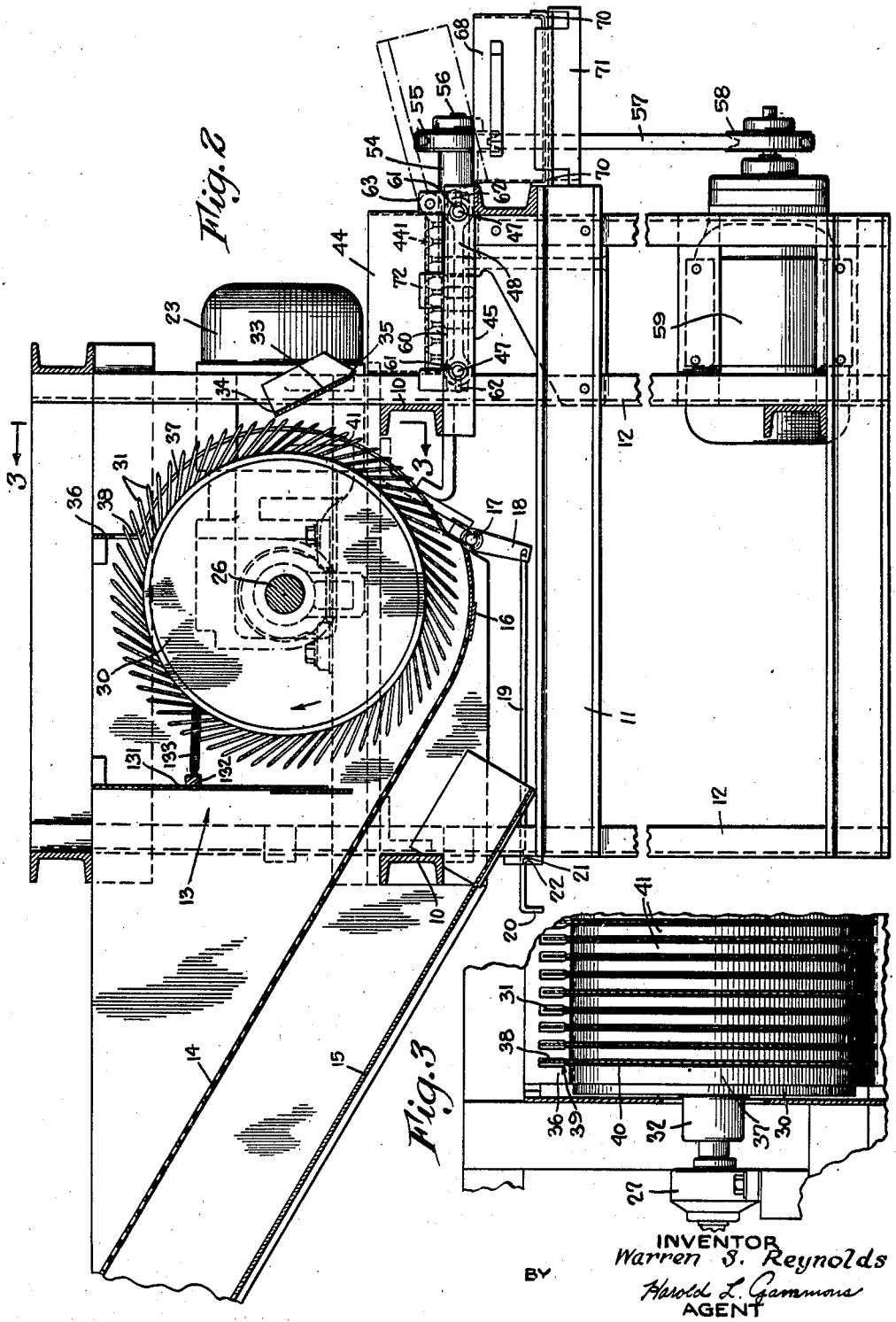

2,341,291

UNITED STATES PATENT OFFICE 2,341,291

MACHINE FOR SEGREGATING SCRAP METAL RINGS FROM DRAWN METALLIC CUPS

Warren S. Reynolds, Stratford, Conn., assignor to Remington Arms Company, Inc., a corporation of Delaware Application December 5, 1941, Serial No. 421,759

9 Claims. (Cl. 209—109)

The present invention relates to a machine for separating solids, particularly for segregating scrap metal rings from drawn metallic cups or cases.

While the invention may be adapted generally to any process requiring the segregation of separable elements of the shape hereinafter described, for the sake of clarity the following description will be given to illustrate the adaptability of the machine of this invention to handling drawn metallic cases produced in the manufacture of ammunition components. It will be understood, however, that this particular application of the invention is by way of example only. The term "case," as hereinafter used, shall be understood to mean a drawn metallic cup or a partially formed cartridge case or bullet jacket.

In the manufacture of drawn metallic shapes, such as metallic cups for ammunition components, the metal is severely strained, and the rim of the cup as drawn is rough and irregular. Since a smooth rim is required it is necessary before such cases may be processed to form a finished cartridge case, to trim off the irregular rims so as to form cases of uniform and accurate overall length. The trimming process removes, as scrap, an irregular, usually ring-shaped rim portion of the case, which may be identified as a "ring." It will be understood, however, that such "rings" or "scrap" may include broken sections, shavings, etc. Frequently this scrap material either drops into the case or otherwise clings tenaciously to it so that mass production lots of trimmed cases contain a relatively large amount of separable scrap. In the rapid production of small components, such as rimfire shells, the separation of scrap from the trimmed cups at the trimming point is impracticable or prohibitively expensive.

A substantial amount of this scrap material may be removed by means of sifters, such as rotating drums or oscillating trays, as are well known in the art. For some purposes the presence of the relatively small amount of scrap material remaining after the usual sifting processes might not be objectionable but in the subsequent processing of cases for ammunition components the presence of a single ring or shaving may cause the destruction of a relatively expensive punch or die. It is necessary, therefore, to insure absolutely clean lots of trimmed cases.

An object of the present invention is to provide a machine for automatically segregating separable elements into two distinct lots, neither lot containing any element of the other. A further object is to remove scrap material clinging to machined articles by impaling the articles and subsequently removing the articles from the impaling means. A further object is to provide impaling means and a comb cooperating with the impaling means for removing the impaled articles therefrom and for removing the scrap material clinging to the impaled articles. A still further object is to provide an assorting machine comprising the combination of a hopper for receiving a quantity of trimmed cases and a reciprocating gauging tray adapted to receive cases from the hopper, the hopper including a pin wheel drum in cooperative relation with a comb for removing cases from the hopper, separating the trimmings from the cases, deflecting the separated trimmings back into the hopper and discharging the cases on to the reciprocating gauging tray.

Other objects, features and advantages of the invention will be more fully described in the specification below.

In the drawings:

Fig. 1 is a plan view of the scrap separator.

Fig. 2 is a left end elevation on line 2—2 of Fig. 1.

Fig. 3 is a front elevation on line 3—3 of Fig. 2 showing a part of the comb structure and pin wheel drum.

In the following description the term "front" of the machine shall be understood to mean the portion of the machine adjacent the bottom of the drawing of Fig. 1, the term "rear" relating to the portion of the machine adjacent the top of the drawings.

Referring to Fig. 1, the bed of the machine is constructed of channel members and angle bars bolted together to form a relatively narrow substantially rectangular frame having parallel side members 10 and cross members 11. The frame is adapted to be supported by vertical legs 12.

Referring to Fig. 2, 13 is a hopper which is supported on the front part of the frame and which extends longitudinally thereof. The bottom 14 of the hopper is inclined to the horizontal, extends forwardly of the frame and is perforated, as shown, for sifting out any scrap that may be present in the material contained in the hopper. Supported beneath the perforated bottom and substantially parallel therewith is a deflector plate 15 adapted to deflect scrap material which falls through the hopper bottom into a suitable scrap bin (not shown). The lowermost portion of the hopper bottom is provided with a displaceable section or trap door 16 suitably hinged as at 17 and actuated by a crank arm 18 and connecting rod 19 having an operating handle 20. The rod is mounted substantially for horizontal movement in the frame and has a notch 21 at its forward end adapted normally to be engaged on a suitable lug 22 fixed to the frame so as to hold the trap door closed. By lifting up on the handle 20 and pushing the rod 19 inwardly, the crank arm pivots counterclockwise (Fig. 2) and swings open the trap door 16. The trap door is closed and held by pulling the rod 19 forwardly and engaging the notch 21 thereof over the fixed lug 22.

131 is a substantially vertical baffle plate secured to the top of the hopper 13 and extending transversely thereof and downwardly in front of the pin-wheel drum, hereinafter described, for regulating the feed of the material in the hopper to the drum. A longitudinally extending bar 132 is secured to the inner wall of the plate 131 to which are attached a plurality of relatively short lengths of coil spring 133 freely pivoted at one end to the bar 132 and adapted to be supported at their opposite ends on the periphery of the drum between parallel rows of article impaling pins. The short lengths of spring serve to knock off or hold back articles which tend to lodge between the rows of pins.

Adjacent the front of the machine and on the left end of the frame, as shown in Fig. 1, is a suitable motor 23 having a bevel gear drive to a separable connector 24. A cooperating connector 25 is fastened to one end of a shaft 26 which extends through the end walls of the hopper 13 and longitudinally of the frame. The shaft 26 is supported on the frame by suitable bearings 27 carried in bearing blocks 28 bolted at substantially the middle of the cross members 11. Suitable collars 29 may be provided on the shaft to prevent endwise displacement thereof in the bearing blocks.

A drum 30 is carried on the shaft 26 within the hopper 13 and comprises a cylindrical surface closed at its opposite ends by disks having drilled hub portions 32 secured on the shaft 26 whereby the drum is rotated by the shaft. Although a single drum has been described it will be clear that the invention contemplates a plurality of such drums carried on the single shaft 26, each drum having a separate hopper 13.

Imbedded in the surface of the drum 30 are the lower ends of a plurality of substantially equally spaced pins 31, each pin (see Fig. 2) projecting outwardly. The pins are shown arranged in substantially parallel rows (Fig. 3) circumscribing the drum, and are inclined at an angle tangentially to the surface of the drum. If preferred, however, other settings of the pins may be made within the scope of this invention.

The drum, which may be defined as a pin wheel drum, or impaling means, is rotated by shaft 26 in the direction indicated by the arrow in Fig. 1, or clockwise as shown in Fig. 2.

The rear wall of the hopper frame is provided with a longitudinal aperture having a discharge chute 33 suitably secured therein. The upper end 34 of the discharge chute projects into the hopper frame in close proximity to the locus of the ends of the revolving pins 31. The chute converges from its relatively wide upper end to a relatively narrow lower lip portion 35 which extends slightly beyond the rear face of the hopper frame. The top of the hopper adjacent the drum may be wholly enclosed or covered by a wire screening.

36 is the upper portion of a slotted plate suitably secured to the underside of the top of the hopper and provided with a lower major portion 37 of curvilinear shape, as shown in Figs. 2 and 3, secured in eccentric relation to the periphery of the drum 30 or to the locus of the ends of the pins 31. In accordance with this construction, when the pins 31 are at the upper portion of their path, the ends of the pins extend a substantial distance through slots in the upper part 36 of the plate, whereas as the pins approach the lower portion of their path the ends of the pins, in effect, recede relative to the lower curvilinear portion 37 of the plate.

The upper end 36 of the plate forms a substantially vertical barrier across the width of the pinwheel drum. This portion of the plate is provided with slots 38 which are only slightly wider than the diameter of an acceptable work piece (Fig. 3) so as to permit the passage of such work pieces or cases but to preclude the passage of scrap material which may be clinging to the cases. At the junction 39 of the vertical portion 36 of the plate with the curvilinear portion 37, the width of each slot decreases abruptly to a relatively narrow slot 40 which is only slightly wider than the diameter of a pin 31. These slots 40 permit the passage of the pins but prevent the escape of scrap rings or trimmings which may have been impaled upon and/or held adjacent the base of any pin. The lower portion of the curvilinear plate, which, as shown in the drawings, comprises a plurality of spaced fingers 41 or a comb structure, forms in effect the lower back portion of the hopper 13. Defective articles or scrap material retained behind the comb 41 are deflected down into the bottom of the hopper adjacent the displaceable trap door 16, while cups which, being adjacent the free ends of the pins, have passed through the relatively wide openings 38, are deflected outwardly by the comb structure on to the chute 33.

At the rear of the frame and supported thereby is a substantially rectangular platform 42—43 constructed similarly to the frame and arranged to support a reciprocating tray 44 located adjacent the lip 35 of the discharge chute 33.

Secured across the platform at each end thereof is a suitable bracket 45 provided with a pair of transversely spaced horizontally drilled holes 46, 46. A pair of parallel longitudinally extending rods 47, 47 are adapted to slide in the holes 46, 46 of each bracket, each rod extending at both ends somewhat beyond the brackets 45, 45. The extending ends of the rods at the left end of the machine are joined by a tie member 48 suitably secured to the rods and provided with a yoke portion 49 drilled to receive a transverse connecting bar pin 50 which hingedly secures a connecting bar 51 to the yoke 49. The opposite end of the bar 51 may be connected to any well known type of eccentric mechanism so as to be reciprocated by suitable drive means. Such a connection may comprise securing the bar 51 to a pin eccentrically located on the face of a plate 53 rotated by a shaft 52. The latter is rotatably supported in a sleeve bearing 54 fastened transversely of the platform 42—43.

The rearwardly projecting end 56 of the shaft 52 is provided with a grooved pulley 55 connected by a V belt 57 to a suitable pulley 58 driven by a motor 59. The latter is shown mounted adjacent the base of the platform at the rear of the machine. When the shaft 56 is thus rotated the eccentric connection of the bar 51 transmits reciprocation to the parallel rods 47, 47. While a simple connecting bar and eccentric pin have been suggested for the eccentric drive, it will be understood that other similar or equivalent means for imparting reciprocation to the rods 47, 47 are within the scope of the invention.

A tray bed is secured on the reciprocating rods 47, 47, to be reciprocated thereby and, in turn, to reciprocate the tray 44, as hereinafter described. The bed comprises a pair of end members 60, 60, each having a pair of drilled holes 61, 61 whereby each end member may be slipped on to the rods 47, 47. Each end member is secured to the rods in spaced-apart relationship by suitable locking studs 62, 62, as shown in Fig. 2. The rear ends of the members 60 are provided with vertical posts 63, 63 which are suitably drilled or slotted to receive the respective ends 64 of a longitudinally extending rod 65 which forms a hinge pin for the tray 44. The latter comprises end members 66 connected to the rod 65 by rearwardly extending lug portions 67 which are drilled so as to be mounted on the rod 65 and to pivot freely thereon. The bottom of the tray 44 is a gauge plate 44' comprising apertures sized to pass acceptable cups but to retain oversize or deformed cups. The tray is supported in normal position on the bed by lugs 69, 69 of the end members 60, 60 which project inwardly substantially horizontally beneath the bottom edges of the ends of the tray. Similar lugs may be formed on the forward ends of the members 60 for supporting the front edges of the tray 44. The vertical lugs 72 of the end members 60 are located immediately adjacent the ends of the tray 44 and serve to hold the tray from moving relative to the bed when being reciprocated by the carrier rods 47. From its normal position the tray 44 may be manually swung to the dotted line position shown in the drawings so as to empty the pieces retained thereon into a second tray 68.

The tray 68 may comprise a box-like structure adapted to slide in parallel angle iron guides 70, 70 mounted on the shelf-like structure 71 which is supported by the platform 42—43.

In the operation of the machine, drawn metallic cups, including edge trimmings or scrap rings clinging thereto, are deposited in large lots on to the hopper bottom 14. Loose scrap material not clinging to the cups may drop through the perforations of the hopper bottom on to the deflector plate 15 and from thence slide into a scrap can. As the pin wheel drum 30 rotates clockwise the pins 31 are driven into the mass of cups so as to impale the cups, including the scrap trimmings or rings, and carry them upwardly out of the hopper. Further rotation of the drum moves the cups and scrap material adjacent the slots in the comb member 36. Those cups which are impaled on the pins are supported relative to the comb so as to pass nicely through the wider slots 38 of the vertical plate portion 36, and any scrap material clinging to the cups is brushed off due to the relatively close fit of each cup as it passes through its respective slot. Those scrap rings or scrap trimmings which are caught on the lower edges of the cups or which have fallen down to the base of the pins 31 are carried below the wider slots 38 of the comb and are retained behind the narrow slots 40 and hence are prevented from escaping from the hopper. These trimmings subsequently drop off the pins 31 and are deflected by the comb fingers 41 into the lower portion of the hopper. Those cups which pass through the wider slots are gradually withdrawn from the ends of the pins due to the eccentric disposition of the curvilinear surface 37 of the comb relative to the locus of the ends of the pins, and are deflected on to the discharge chute 33. The cups or cases fall from the chute into the reciprocating gauging tray 44 which further segregates the acceptable and non-acceptable cases. Those cases which are acceptable fall through the tray to a suitable bin while the defective cases accumulate in the tray and are finally removed by pivoting the tray upwardly and dumping the contents into the scrap tray 68.

Although the above description relates to the device shown, it will be understood that other variations and modifications may be made within the scope of this invention as defined in the appended claims.

What is claimed is:

1. A machine for segregating separable elements, comprising a hopper for said elements having a displaceable section in the bottom thereof, means for removing said elements from said hopper, said removing means comprising element-impaling means, a discharge chute in said hopper, and a comb cooperating with said impaling means, said comb having slots of varying width to deflect certain of said articles therefrom into said chute and to deflect certain others of said elements into the displaceable section of said hopper.

2. A machine for automatically segregating separable elements, comprising a hopper for said elements having a displaceable section in the bottom thereof, means for removing said elements from said hopper, said removing means comprising element-impaling means, a discharge chute in said hopper, a comb cooperating with said impaling means, said comb having rectilinearly converging slots to deflect certain of said articles therefrom into said chute and to deflect certain others of said elements into the displaceable section of said hopper, and means for actuating said displaceable section to discharge said certain others of said elements from said hopper.

3. A machine for automatically segregating separable scrap from drawn metallic cups, comprising a hopper for the cups, a revolving drum for removing said cups including said scrap from said hopper, said revolving drum comprising impaling means, means on said drum for removing scrap and cups from between said impaling means, and comb means cooperating with said impaling means for removing the cups impaled thereon.

4. A machine for automatically segregating separable scrap from drawn metallic cups, comprising a hopper for the cups having a displaceable section in the bottom thereof, a revolving drum for removing said cups including said scrap from said hopper, said revolving drum comprising a plurality of impaling pins, a discharge chute in said hopper, knock-off means supported by said drum between said pins for removing scrap and cups from between said pins, fingers in juxtaposition to said pins for deflecting the cups impaled thereon into said chute, said fingers deflecting the scrap to the displaceable section of said hopper, and a lever to actuate said displaceable section to discharge the scrap from said hopper.

5. A machine for automatically segregating separable scrap from drawn metallic cups comprising, in combination, a frame, a hopper for said cups supported on said frame having a discharge chute and a displaceable section in the bottom thereof, a reciprocable perforated tray carried on said frame adjacent said discharge chute, means for reciprocating said tray to sift the cups therein, a motor on said frame, a drum mounted in said hopper and rotated by said motor for removing said cups including said scrap from said hopper, said drum comprising circumferentially spaced impaling pins, spaced parallel fingers of varying width in juxtaposition to said pins to withdraw cups impaled on said pins and deflect said cups into said chute whereby the cups are delivered into the reciprocating tray, said fingers deflecting the scrap to the displaceable section of said hopper, and a lever fastened on said frame for actuating said displaceable section to discharge the scrap from said hopper.

6. In a machine for assorting work pieces, in combination, a hopper for receiving said work pieces, means for removing said work pieces from said hopper, said means comprising a plurality of pins movable into the work pieces in said hopper so as to impale said work pieces, means between said pins for removing work pieces from between said pins, and single means to remove acceptable work pieces from said pins and to discharge such pieces from said hopper, said means deflecting non-acceptable pieces back into the hopper.

7. In a machine for assorting work pieces, in combination, a hopper for receiving said work pieces, means for removing said work pieces from said hopper, said means comprising a drum member having a plurality of circumferentially projecting pins thereon movable into the work pieces in said hopper so as to impale said work pieces, and combing means comprising a fixed slotted plate partially circumscribing said drum in eccentric relation thereto and in cooperative relation with said pins, said combing means having rectilinearly converging slots both to remove acceptable work pieces from said pins and discharge such pieces from said hopper, and to deflect non-acceptable pieces back into the hopper.

8. In a machine for assorting work pieces having scrap rings clinging thereto, in combination, a hopper for receiving said work pieces, means for removing said work pieces and scrap from said hopper, said means comprising a drum member having a plurality of impaling pins thereon adapted to impale said work pieces and scrap rings and remove them from said hopper, and a comb member having a plurality of slots cooperating with said pins, each slot comprising a relatively wide upper portion only slightly greater in width than the diameter of an acceptable work piece so that scrap rings clinging to said work pieces are unable to pass through said upper portion with said work piece and are thereby removed therefrom, and a relatively narrow lower portion only slightly greater in width than the diameter of an impaling pin so that scrap rings removed from the acceptable work pieces are unable to pass through said lower portion with said pins and are thereby retained within the hopper.

9. A machine for segregating separable elements comprising a hopper for said elements; means for removing said separable elements from said hopper, said removing means comprising a drum having pins for impaling said separable elements; and a member in cooperative relationship with said pins having slots of varying width to engage the separable elements impaled on said pins to separate the acceptable elements from the non-acceptable elements and to remove the acceptable elements from said pins.

WARREN S. REYNOLDS.